[72] Inventor Rene H. Vansteenkiste
 Grosse Pointe Woods, Mich.
[21] Appl. No. 779,418
[22] Filed Nov. 27, 1968
[45] Patented Oct. 5, 1971
[73] Assignee The Budd Company
 Philadelphia, Pa.

[54] ELECTRON BEAM-WELDING METHOD OF FABRICATING A BRAKE DISK
2 Claims, 2 Drawing Figs.
[52] U.S. Cl. .................................................. 219/121EB,
 29/472.3
[51] Int. Cl. ........................................ B23k 15/00
[50] Field of Search .......................... 29/472.3;
 219/121 EB, 121; 188/218 A, 218 M

[56] References Cited
UNITED STATES PATENTS
3,185,815  5/1965  Anderson ..................... 219/137
3,486,218  12/1969  Buyze .......................... 29/472.3

*Primary Examiner*—J. V. Truhe
*Assistant Examiner*—Robert E. O'Neill
*Attorneys*—Thomas I. Davenport, Edward M. Farrell, Alford L. Trueax, Jr. and William R. Nolte ABSTRACT: A method of joining metal stampings and roll-formed parts into a fabricated brake disk. This method utilizes an electron beam welder for joining the various components of the brake disk assembly into an assembled brake disk by clamping the various formed parts in a holding fixture and applying the welding electron beam to the adjoining portions thereof to weld them into a complete brake disk structure.

PATENTED OCT 5 1971

3,610,873

INVENTOR.
RENE H. VANSTEENKISTE

ATTORNEY

ELECTRON BEAM-WELDING METHOD OF FABRICATING A BRAKE DISK

This invention relates to a fabricated disk for a motor vehicle brake and more particularly to a method of fabricating the brake disk by means of an electron beam welder.

The present methods of manufacturing ventilated brake disks have been mostly confined to the process of casting the entire brake disk and mounting assembly in one operation and then machining to the finished product. This method of casting has been used because of the necessary ventilating features that require rib sections to extend between the braking plates of the brake disk for providing cooling air circulation therebetween during operation. Such casting operations are complicated and require a large number of man hours per brake disk produced because of the difficulty of producing good castings of this intricate shape.

A recently developed method of fabricating a brake disk consists of stamping and roll forming various component of a brake disk, placing the component parts in a holding fixture, and then joining the various components by spot or seam welding, brazing, or using high-temperature resins. Spot or seam welding and brazing affect the braking surface of the brake plate by softening the surface at the weld point.

It is an object of this invention to provide a better method of joining the fabricated ventilated brake disk by focusing an electron beam along the surfaces to be joined and rotating the holding fixture and components in the plane of the beam until the disks have been joined to the corrugated section forming the fabricated brake disk.

Another object of this invention is to provide a method of welding the brake disk components without heat affecting the working surface of the brake plates.

These and other objects of this invention will become apparent with reference to the following specification and drawings wherein.

Figures 1, 2:
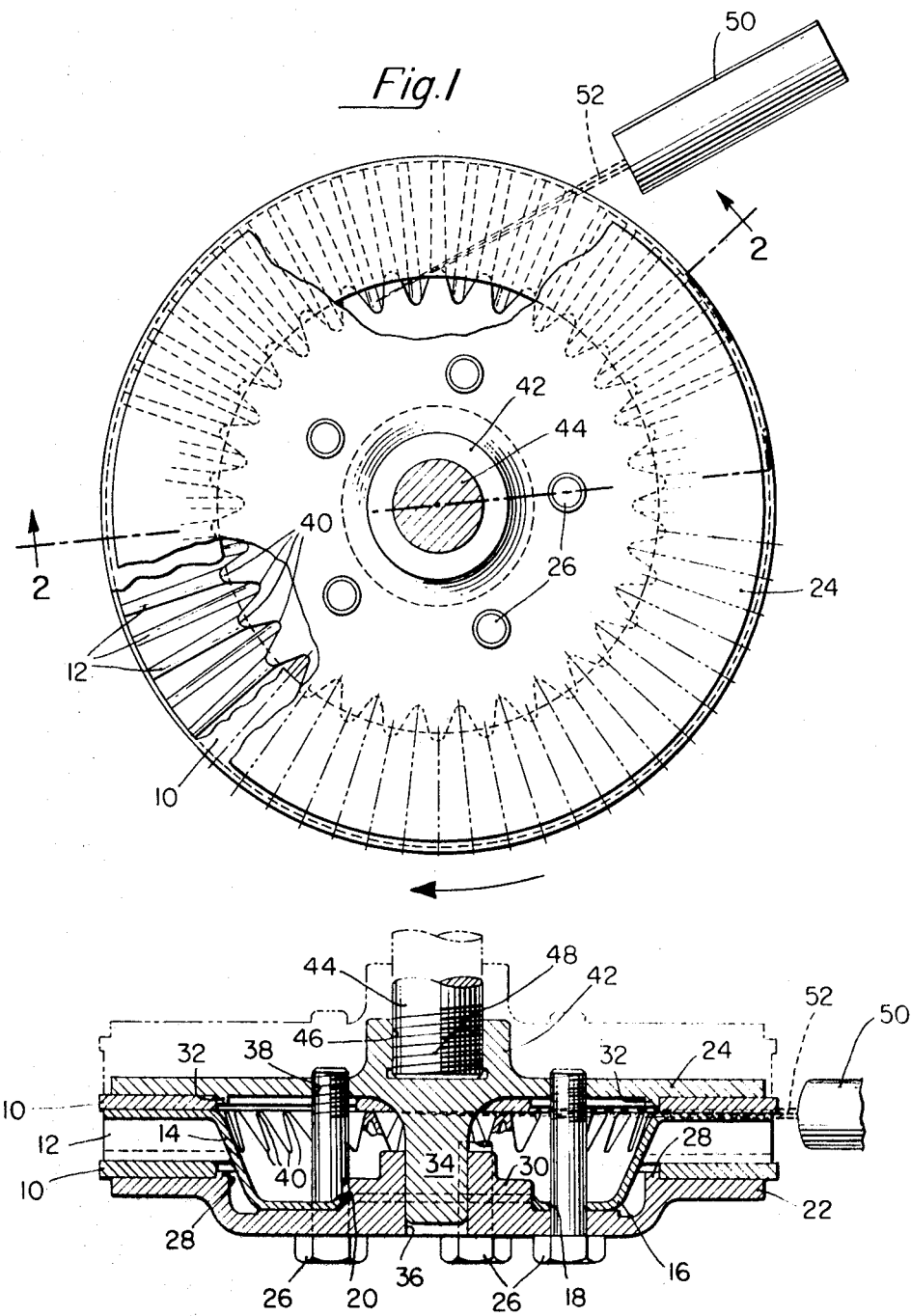
FIG. 1 is a plan view of the brake disk components assembled in the holding fixture in position adjacent the electron beam welder for fabricating the disk.
FIG. 2 is a view in the direction of the arrows substantially along the line 2—2 of FIG. 1 illustrating the manner in which the disk components are placed in the holding fixture for welding.

This method of fabricating the brake disk consists of assembling a pair of brake plates 10 each side of the corrugations 12 of a hat-shaped combination spacer-mounting flange stamping 14. The raised section 16 of the combined spacer-mounting flange 14 is provided with five apertures 18 equally spaced about a central aperture 20 for mounting the brake disk on the studs of the wheel mount surrounding the end of the axle of a motor vehicle.

The holding fixture assembly consists of a female plate 22 and a male plate 24 secured together by a plurality of bolts 26 which extend through the female mounting plate 22, through the apertures 18, and are threadably secured in the male plate 24.

In assembling the brake disk assembly, one of the brake plates 10 is placed on the female holding plate 22 and is located thereon by an inner raised rib section 28. Then the combination spacer-mounting flange 14 is placed on the female mounting plate 22 above the brake plate 10 with the apertures 18 passing about the bolts 26 and the central aperture 20 about a central raised portion 30 of the mounting plate 22 for proper location. Then the other brake plate 10 is placed on the upper portion of the corrugations 12 and properly located thereon by the raised rib 32 of the male holding fixture positioned above the upper brake plate 10. The upper holding plate 24 is properly located relative to the lower holding plate by a central shaft 34 accommodated by a slip fit in a central aperture 36 of the female holding plate 22. When the plates of the holding fixture are properly assembled, the bolts 26 are screwed in accommodating threaded apertures 38 in the male holding plate 24 until the brake plates are securely held against the nodes 40 of the corrugated spacer portion 12.

An attaching means 42 extends outwardly from the holding plate 24 for securing the holding fixture and secured assembly on a rotatable shaft 44. Any suitable attaching means would be acceptable, but in this case threaded aperture 46 is provided to threadably receive the threaded end 48 of the shaft 44.

When assembled as seen in FIG. 1, the electron beam welder 50 has the beam 52 thereof directed to bear on the nodes 40 of the corrugated section and the abutting brake disk 10 so that both will be melted and joined by the beam. It will also be noted, the beam 52 is specifically aimed to miss the hat portion 16 of the combination spacer-mounting flange 14 so that as the shaft 44 rotates the fixture and brake disk assembly the nodes 40 and the brake disk 10 will be welded to each other and the hat section will not be affected. When the shaft 44 has rotated the fixture 360° with the electron beam actuated, an indexing device will move the assembly to position shown in phantom lines of FIG. 2 at which position another 360° rotation of the holding fixtures and brake disk assembly will weld the other plate 10 to the opposite nodes 40 of corrugation 12, thus providing a completely fabricated brake disk assembly.

The unique quality of an electron beam welder that permits one to focus its welding beam 52 to the desired depth of weld and to a desired beam width enables it to provide a satisfactory weld between the nodes 40 and the abutting brake plates without affecting the outer or braking surfaces of the brake plates.

While but one method of welding fabricating disk by means of an electron beam welder has been shown and described, it is obvious that modification of the holding fixture and steps may be made without departing from the scope of the following claims.

I claim:

1. The method of electron beam welding a fabricated brake disk having a pair of brake plates and a combination corrugated spacer means having a plurality of nodes and mounting flange which comprises the steps of:
   1. Assembling the brake plates and combination spacer means and mounting flange in a holding fixture,
   2. Securing the holding fixture and assembled brake disk components on a rotatable shaft with the plane of one of the brake plates and abutting nodes of the corrugated spacer means in alignment with the beam of an electron beam welder,
   3. Actuating the electron beam welder and rotating the holding fixture and brake disk assembly at least 360° while the electron beam welder is so actuated wherein the beam of the electron beam welder is directed to intersect at least two or more of the nodes and adjacent brake plate and to miss any other portion of the combination spacer means,
   4. Deactivating the electron beam welder and indexing the shaft, holding fixture, and brake disk assembly until the plane of the other brake plate and opposite nodes of the corrugated spacer means are aligned with the beam of the electron beam welder,
   5. Reactivating the electron beam and rotating the fixture and brake disk assembly 360° while so actuated wherein the beam of the electron beam welder is directed to intersect at least two or more of the anodes and adjacent brake plate and to miss any other portion of the combination spacer means.

2. The method of electron beam welding a fabricated brake disk having a pair of brake plates and a combination corrugated spacer means having a plurality of nodes and mounting flange which comprises the steps of:
   1. Assembling the brake plates and combination spacer means and mounting flange in a holding fixture,
   2. Securing the holding fixture and assembled brake disk components on a rotatable shaft with each plane of each brake plate and abutting nodes of the corrugated spacer means in alignment with the beam of an electron beam welder, 3. Actuating the electron beam welders and rotating the shaft until all the points of abutment between the brake plates and nodes on each plane are welded by the electron beam welders wherein the beam of the electron beam welder is directed to intersect at least two or more of the nodes and adjacent brake plate and to miss any other portion of the combination spacer means, 4. Deactivating the electron beam welders and removing the fabricated brake disk from the holding fixture.